Patented Dec. 12, 1944

2,364,778

UNITED STATES PATENT OFFICE 2,364,778

CONCENTRATION OF OXIDIZED IRON ORES

Earl H. Brown and Francis X. Tartaron, Hibbing, Minn., assignors to Minerals Separation North American Corporation, New York, N. Y., a corporation of Maryland No Drawing. Application February 25, 1944, Serial No. 523,924

16 Claims. (Cl. 209—166)

This invention relates to the concentration of iron ores and more particularly to the concentration of finely-divided low grade iron ores in which the iron is present as one of the several oxides of iron or as the carbonate of iron, and in which the gangue is principally silica or quartz.

In our copending application, Serial No. 496,582, filed July 29, 1943, we have described a method of concentrating finely-divided oxidized iron ores in which the gangue ingredient is principally quartz, which consists in treating an aqueous pulp of such an ore with an anionic collecting agent selected from the class consisting of higher fatty acids and resin acids and mixtures of fatty and resin acids and soaps thereof, and with cooperating agents consisting of lime and an aqueous solution of gelatinized starch; and subjecting the thus treated ore pulp to froth-flotation treatment and removing the quartz-containing froth, thereby producing in the residue of the pulp an oxidized-iron concentrate. In the methods described in that prior application, the starch preferably was gelatinized by boiling it in water with caustic soda; but examples were included in which the method utilized starch which had been gelatinized merely by boiling it in an aqueous suspension, or without heating by merely agitating a mixture of starch and caustic soda in an aqueous suspension.

The present invention is the result of our further discovery that highly satisfactory results may be obtained in practicing the said method with an aqueous solution of acid-treated starch. We have found that the best results are obtained by treating the starch with an acidic compound in an aqueous mixture, particularly when the pH of the said solution is low. This discovery resulted from extensive research and tests from which the conclusion appears justified that when acid-treated starch is employed, best results are obtained when the aqueous solution of starch and acid has a pH lower than 3.0, and preferably ranging from about 1.6 to about 2.2. Furthermore, our research and tests seem to lead to the conclusion that, when acid salts are employed in treating the starch, best results are obtained in practicing the method when the pH of the aqueous solution of starch and acid salt is kept at the lowest practical pH, and the results of the method grow poorer as the pH of the aqueous solution of starch and acid salt increases. It is not essential, however, that the pH of the starch solutions when added to the ore pulp be lower than 3 or as low as practicable; since tests have proved that after the acid treatment of the starch the solution may be neutralized before being used in the process, without substantially affecting the results. By "solution" as used in this specification we intend to include both colloidal and molecular dispersions. Measurements of pH were made on the aqueous solution of acid-treated starch at room temperature, employing a Beckman pH meter, model M.

Our experiments seem to have proved also that the acid-treatment of the starch can best be carried out by boiling only briefly a mixture of the starch and acidic compound with water; although we have succeeded in acid-treatment of the starch in a mixture with water without boiling, in a manner hereinafter described in Example XII. We have found that best results are obtained if the mixture of starch, acidic compound and water is treated only enough to cause partial depolymerization and make the starch miscible with water, but not so as to form degradation products of the nature of dextrin, which seem to give only feeble results in practicing the method of concentration. In general, boiling of the said mixture for only about one minute has been found to produce a satisfactory acid-treated starch solution.

In producing the aqueous solution of acid-treated starch employed in the examples hereinafter described, we have successfully used the following typical inorganic acidic compounds: sulphuric acid, hydrochloric acid, nitric acid, ferric ammonium chloride, ferric ammonium sulphate, ferric chloride, ferric sulphate, hydrofluoric acid and stannic chloride. In the treatment of the starch, we have also successfully used typical organic acidic compounds, such as tartaric acid and oxalic acid.

The anionic collecting reagents useful in the present methods are the same as those described as useful in the method described in the aforesaid copending application, namely, those selected from the class consisting of higher fatty acids and resin acids and mixtures of fatty and resin acids, and soaps thereof. Examples are hereinafter given of the use, as anionic collecting agents in practicing the invention, of a mixture of fatty and resin acids such as that which is produced as a by-product in paper making and sold under the name "Varlacoid"; soap made by neutralization of these mixtures of acids; sodium resinate; sodium oleate; linoleic acid; fish-oil fatty acid; and rosin acid. In some cases, we have found it advantageous to dilute these collecting agents, particularly "Varlacoid," with cresylic acid or alcohol to facilitate their mixing into the ore pulp. The cresylic acid may also be useful in increasing the amount of froth produced in the flotation operation.

We have also proved that the method may be successfully practiced with yellow cornmeal or a refined wheat flour as the starch bearing material, as will be evident from Examples XIX and XX hereinafter given.

The invention will be understood from the following description of examples of the practicing thereof. In all of the examples, the oxidized-iron ore feed was washer classifier overflow from which an 8% portion which was plus 100 mesh was screened out, ground through 100 mesh and added to the minus 100 mesh portion, thereby providing a feed which was all minus 100 mesh. An aqueous pulp of this feed, containing about 10% solids, was conditioned with the anionic collecting agents and with the cooperating agents consisting of an aqueous suspension of lime and the aqueous solution of acid-treated starch; after which the thus conditioned pulp was subjected to froth-flotation treatment and the silica-containing froth was removed and discarded. Then the residue of this first froth-flotation treatment was further conditioned with additional quantities of said reagents, subjected to froth-flotation treatment, and the silica-containing froth was removed and discarded. In some cases, the residue of the second froth-flotation treatment was further conditioned by the addition of one or more of the said reagents, was subjected to froth-flotation, and the silica-containing froth was removed and discarded. The pulp was agitated for about one minute after the addition of each reagent. The residue of the aforesaid treatments was the oxidized-iron concentrate.

In Examples I to XI, the same quantities of reagents were used, the only differences in these examples being in the kind of acidic compound employed and its proportion to the starch which was treated as a 2% mixture in water by boiling the mixture of starch, acidic compound and water for about one minute. The pH of the aqueous solution of acid-treated starch depends upon the proportion of the acidic compound to the starch, that is, the greater the proportion of the acidic compound the lower the pH and vice versa, for any particular acidic compound. That will be apparent from the data hereinafter given regarding tests of the method. The lime employed in the examples was in the form of a 25% suspension in water. The anionic collecting reagent employed in Examples I to XI was a mixture of Varlacoid and cresylic acid in the proportions of 95 parts of the former to 5 parts of the latter. The quantities of reagents used, in lbs. per ton of feed, were as follows:

| Reagents | First float |
|---|---|
| | Lbs./ton |
| Acid-treated starch | 2.5 |
| Lime | 4.0 |
| Varlacoid-cresylic acid (95-5) | 1.0 |

| Reagents | Second float |
|---|---|
| | Lbs./ton |
| Acid-treated starch | 0.25 |
| Lime | 1.00 |
| Varlacoid-cresylic acid (95-5) | 0.50 |

| Reagents | Third float |
|---|---|
| | Lbs./ton |
| Varlacoid-cresylic acid (95-5) | 0.50 |

Of course, the proportions of and the manner of adding the reagents and the number of flotation treatments, may be varied without departing from the spirit and scope of the invention.

EXAMPLE I

Starch treated with sulphuric acid

In practicing the invention with starch treated with sulphuric acid (sp. gr. 1.84), the best results were obtained when the proportions of starch to sulphuric acid were 97-3, which produced a pH of 2.0 in the aqueous acid-treated starch solution. The results of this test were as follows:

| Product | Per cent weight | Per cent Fe | Per cent silica | Per cent Fe recovery |
|---|---|---|---|---|
| Feed | 100.0 | 22.11 | | 100.0 |
| First froth | 51.6 | 3.26 | | 7.6 |
| Second froth | 15.7 | 8.79 | | 6.2 |
| Third froth | 2.8 | 39.23 | | 5.0 |
| Concentrate | 29.9 | 60.03 | 4.92 | 81.2 |

Comparative, less efficient but still satisfactory results using greater and less proportions of sulphuric acid to starch in the making of the aqueous acid-treated starch solution, were as follows:

| Proportion of starch to sulphuric acid | pH | Concentrate | | | |
|---|---|---|---|---|---|
| | | Per cent weight of feed | Per cent Fe | Per cent silica | Per cent Fe recovery |
| 93-7 | 1.6 | 31.8 | 58.01 | 6.80 | 84.6 |
| 99-1 | 2.2 | 28.9 | 59.50 | 5.35 | 77.6 |

EXAMPLE II

Starch treated with hydrochloric acid

In practicing the invention with starch treated with hydrochloric acid (sp. gr. 1.18), the best results were obtained when the proportions of starch to hydrochloric acid were 97-3, which produced a pH of 2.2 in the aqueous acid-treated starch solution. The results of this test were as follows:

| Product | Per cent weight | Per cent Fe | Per cent silica | Per cent Fe recovery |
|---|---|---|---|---|
| Feed | 100.0 | 23.05 | | 100.0 |
| First froth | 54.5 | 3.70 | | 8.8 |
| Second froth | 11.8 | 10.74 | | 5.5 |
| Third froth | 2.2 | 42.33 | | 4.0 |
| Concentrate | 31.5 | 59.79 | 5.27 | 81.7 |

Comparative, less efficient but still satisfactory results using greater and less proportions of hydrochloric acid to starch in the making of the aqueous acid-treated starch solution, were as follows:

| Proportion of starch to sulphuric acid | pH | Concentrate | | | |
|---|---|---|---|---|---|
| | | Per cent weight of feed | Per cent Fe | Per cent silica | Per cent Fe recovery |
| 93-7 | 1.8 | 30.7 | 58.49 | 6.50 | 83.6 |
| 99-1 | 2.6 | 29.2 | 56.21 | 10.75 | 76.0 |

EXAMPLE III

Starch treated with nitric acid

In practicing the invention with starch treated with nitric acid (sp. gr. 1.42), the best results were obtained when the proportions of starch to nitric acid were 97-3, which produced a pH of 2.2 in the aqueous acid-treated starch solution. The results of this test were as follows:

| Product | Per cent weight | Per cent Fe | Per cent silica | Per cent Fe recovery |
|---|---|---|---|---|
| Feed | 100.0 | 22.12 | | 100.0 |
| First froth | 52.2 | 2.46 | | 5.9 |
| Second froth | 14.3 | 9.26 | | 6.1 |
| Third froth | 2.6 | 40.17 | | 4.7 |
| Concentrate | 30.9 | 59.67 | 5.40 | 83.3 |

Comparative, less efficient but still satisfactory results using greater and less proportions of nitric acid to starch in the making of the aqueous acid-treated starch solution, were as follows:

| Proportion of starch to nitric acid | pH | Concentrate | | | |
|---|---|---|---|---|---|
| | | Per cent weight of feed | Per cent Fe | Per cent silica | Per cent Fe recovery |
| 93-7 | 1.7 | 32.5 | 58.01 | 7.60 | 85.4 |
| 99-1 | 2.5 | 26.8 | 57.92 | 8.00 | 71.7 |

EXAMPLE IV

*Starch treated with ferric ammonium chloride*

In practicing the invention with starch treated with ferric ammonium chloride, the best results were obtained when the proportions of starch to that acidic compound were 93-7 which produced a pH of 1.9 in the aqueous acid-treated starch solution. The results of this test were as follows:

| Product | Per cent weight | Per cent Fe | Per cent silica | Per cent Fe recovery |
|---|---|---|---|---|
| Feed | 100.0 | 21.77 | | 100.0 |
| First froth | 58.0 | 3.74 | | 9.9 |
| Second froth | 10.6 | 10.00 | | 4.9 |
| Third froth | 1.6 | 39.51 | | 2.9 |
| Concentrate | 29.8 | 60.08 | 5.02 | 82.3 |

Comparative, less efficient but still satisfactory results using a less proportion of ferric ammonium chloride to starch in the making of the aqueous starch solution, were as follows:

| Proportion of starch to ferric ammonium chloride | pH | Concentrate | | | |
|---|---|---|---|---|---|
| | | Per cent weight of feed | Per cent Fe | Per cent silica | Per cent Fe recovery |
| 97-3 | 2.3 | 26.5 | 59.10 | 6.23 | 71.2 |

EXAMPLE V

*Starch treated with ferric ammonium sulphate*

In practicing the invention with starch treated with ferric ammonium sulphate (iron and ammonium sulphate, purified), the best results were obtained when the proportions of starch to that acidic compound were 85-15 which produced a pH of 2.2 in the aqueous acid-treated starch solution. The results of this test were as follows:

| Product | Per cent weight | Per cent Fe | Per cent silica | Per cent Fe recovery |
|---|---|---|---|---|
| Feed | 100.0 | 21.52 | | 100.0 |
| First froth | 34.9 | 3.96 | | 6.4 |
| Second froth | 28.0 | 7.19 | | 9.4 |
| Third froth | 8.7 | 28.02 | | 11.3 |
| Concentrate | 28.4 | 55.23 | 12.20 | 72.9 |

Comparative, less efficient but still satisfactory results using a less proportion of ferric ammonium sulphate to starch in the making of the aqueous starch solution, were as follows:

| Proportion of starch to ferric ammonium sulphate | pH | Concentrate | | | |
|---|---|---|---|---|---|
| | | Per cent weight of feed | Per cent Fe | Per cent silica | Per cent Fe recovery |
| 93-7 | 2.35 | 28.9 | 52.36 | 16.53 | 70.6 |

EXAMPLE VI

*Starch treated with ferric chloride*

In practicing the invention with starch treated with ferric chloride, the best results were obtained when the proportions of starch to ferric chloride were 93-7 which produced a pH of 1.9 in the aqueous acid-treated starch solution. The results of this test were as follows:

| Product | Per cent weight | Per cent Fe | Per cent silica | Per cent Fe recovery |
|---|---|---|---|---|
| Feed | 100.0 | 21.77 | | 100.0 |
| First froth | 55.0 | 3.65 | | 9.2 |
| Second froth | 13.5 | 10.54 | | 6.5 |
| Third froth | 2.5 | 41.20 | | 4.8 |
| Concentrate | 29.0 | 59.69 | 5.08 | 79.5 |

Comparative, less efficient but still satisfactory results using less proportions of ferric chloride to starch in the making of the aqueous starch solution, were as follows:

| Proportion of starch to ferric chloride | pH | Concentrate | | | |
|---|---|---|---|---|---|
| | | Per cent weight of feed | Per cent Fe | Per cent silica | Per cent Fe recovery |
| 97-3 | 2.3 | 27.4 | 58.69 | 6.42 | 73.8 |
| 99-1 | 2.7 | 27.9 | 55.19 | | 71.6 |

EXAMPLE VII

*Starch treated with ferric sulphate*

In practicing the invention with starch treated with ferric sulphate, the best recovery was obtained when the proportions of starch to ferric sulphate were 93-7 which produced a pH of 2.2 in the aqueous acid-treated starch solution. The results of this test were as follows:

| Product | Per cent weight | Per cent Fe | Per cent silica | Per cent Fe recovery |
|---|---|---|---|---|
| Feed | 100.0 | 21.51 | | 100.0 |
| First froth | 33.2 | 3.88 | | 6.0 |
| Second froth | 28.4 | 5.00 | | 6.6 |
| Third froth | 8.0 | 23.01 | | 8.6 |
| Concentrate | 30.4 | 55.80 | 11.17 | 78.8 |

Using a greater proportion of ferric sulphate to starch in the making of the aqueous starch solution, the results were as follows:

| Proportion of starch to ferric sulphate | pH | Concentrate | | | |
|---|---|---|---|---|---|
| | | Per cent weight of feed | Per cent Fe | Per cent silica | Per cent Fe recovery |
| 85-15 | 2.05 | 27.4 | 57.53 | 8.13 | 72.3 |

Example VIII

Starch treated with hydroflouric acid

In practicing the invention with starch treated with hydrofluoric acid (48% solution), the best results were obtained when the proportions of starch to acid were 85-15 which produced a pH of 2.2 in the aqueous acid-treated starch solution. The results of this test were as follows:

| Product | Per cent weight | Per cent Fe | per cent silica | Per cent Fe recovery |
|---|---|---|---|---|
| Feed | 100.0 | 21.47 | | 100.0 |
| First froth | 38.3 | 3.97 | | 7.1 |
| Second froth | 27.9 | 8.26 | | 10.7 |
| Third froth | 7.4 | 34.10 | | 11.8 |
| Concentrate | 26.4 | 57.26 | 8.79 | 70.4 |

Comparative, less efficient but still satisfactory results using a less proportion of said acid to starch in the making of the aqueous starch solution, were as follows:

| Proportion of starch to hydrofluoric acid | pH | Concentrate | | |
|---|---|---|---|---|
| | | Per cent weight of feed | Per cent Fe | Per cent Fe recovery |
| 93-7 | 2.15 | 33.9 | 51.86 | 81.7 |

Example IX

Starch treated with stannic chloride

In practicing the invention with starch treated with stannic chloride, the following results were obtained when the proportions of starch to stannic chloride were 93-7 which produced a pH of 1.8 in the aqueous acid-treated starch solution.

| Product | Per cent weight | Per cent Fe | Per cent silica | Per cent Fe recovery |
|---|---|---|---|---|
| Feed | 100.0 | 21.68 | | 100.0 |
| First froth | 53.8 | 4.22 | | 10.5 |
| Second froth | 15.2 | 11.84 | | 8.3 |
| Third froth | 3.2 | 42.25 | | 6.2 |
| Concentrate | 27.8 | 58.47 | 6.69 | 75.0 |

Example X

Starch treated with tartaric acid

In practicing the invention with starch treated with tartaric acid the best results were obtained when the proportions of starch to tartaric acid were 93-7 which produced a pH of 2.5 in the aqueous starch solution. The results of this test were as follows:

| Product | Per cent weight | Per cent Fe | Per cent silica | Per cent Fe recovery |
|---|---|---|---|---|
| Feed | 100.0 | 22.02 | | 100.0 |
| First froth | 32.6 | 4.55 | | 6.7 |
| Second froth | 30.6 | 6.34 | | 8.8 |
| Third froth | 7.4 | 25.20 | | 8.5 |
| Concentrate | 29.4 | 56.91 | 10.39 | 76.0 |

Comparative, less efficient but still satisfactory results using a greater proportion of tartaric acid to starch in the making of the aqueous starch solution, were as follows:

| Proportion of starch to tartaric acid | pH | Concentrate | | | |
|---|---|---|---|---|---|
| | | Per cent weight of feed | Per cent Fe | Per cent silica | Per cent Fe recovery |
| 85-15 | 2.4 | 26.2 | 56.50 | 10.43 | 67.7 |

Example XI

Starch treated with oxalic acid

In practicing the invention with starch treated with oxalic acid, when the proportions of starch to oxalic acid were 85-15 which produced a pH of 1.7 in the aqueous acid-treated starch solution, the results were as follows:

| Product | Per cent weight | Per cent Fe | Per cent silica | Per cent Fe recovery |
|---|---|---|---|---|
| Feed | 100.0 | 21.82 | | 100.0 |
| First froth | 64.8 | 5.99 | | 17.8 |
| Second froth | 6.8 | 17.29 | | 5.4 |
| Third froth | 1.8 | 44.95 | | 3.7 |
| Concentrate | 26.6 | 59.98 | 5.42 | 73.1 |

Using a less proportion of oxalic acid to starch in the making of the aqueous starch solution, gave the following results:

| Proportion of starch to oxalic acid | pH | Concentrate | | | |
|---|---|---|---|---|---|
| | | Per cent weight of feed | Per cent Fe | Per cent silica | Per cent Fe recovery |
| 93-7 | 1.95 | 32.5 | 56.73 | 9.70 | 85.4 |

Example XII

Starch treated with acid without boiling

In the foregoing examples, as hereinbefore stated, the starch was treated by boiling it with an acidic compound in an aqueous mixture. The present example demonstrates that the invention may be practiced with starch which has been treated with an acidic compound without boiling. 25 grams of dry starch were covered with a 7½% hydrochloric acid solution and allowed to stand at room temperature (24° C.) for 7 days during which the mixture was stirred three times a day. The thus treated starch was filtered, then washed with alcohol until free of acid, and was dried at 130° C. The product thus obtained was made up as a 2% solution in water, and in that form was used as the cooperating agent. The reagent quantities employed in this test were the same as those used in connection with Examples I to XI, except that in conditioning the ore for the first flotation treatment only 1.5 lbs. (instead of 2.5 lbs.) of the aqueous acid-treated starch was used. The results of the treatment were as follows:

| Product | Per cent weight | Per cent Fe | Per cent Fe recovery |
|---|---|---|---|
| Feed | 100.0 | 18.72 | 100.0 |
| First froth | 48.6 | 2.84 | 7.3 |
| Second froth | 18.4 | 4.70 | 4.6 |
| Third froth | 6.2 | 18.25 | 6.1 |
| Concentrate | 26.8 | 57.26 | 82.0 |

Example XIII

Sodium resinate as the collecting agent

In the foregoing Examples I to XII, the anionic collecting agent employed was a mixture of Varlacoid and cresylic acid. In the tests about to be described the collecting agent was sodium resinate which was used as a 1% water solution. The quantities of reagents used, in lbs. per ton of feed, were as follows:

| Reagents | First float |
|---|---|
| | Lbs./ton |
| Acid-treated starch | 2.5 |
| Lime | 4.0 |
| Sodium resinate | 0.4 |

| Reagents | Second float |
|---|---|
| | Lbs./ton |
| Acid-treated starch | 0.25 |
| Lime | 1.0 |
| Sodium resinate | 0.2 |

| Reagents | Third float |
|---|---|
| | Lbs./ton |
| Sodium resinate | 0.2 |

The following table shows the excellent results obtained by practicing the invention using sodium resinate as the anionic collecting agent, with cooperating agents consisting of lime and starch treated with sulphuric acid or hydrochloric acid or nitric acid, the proportions of starch to acid being indicated in parentheses after the name of each acid:

| Acid used in gelatinizing the starch | ph | Concentrate | | |
|---|---|---|---|---|
| | | Per cent weight of feed | Per cent Fe | Per cent Fe recovery |
| Sulphuric acid (97-3) | 2.0 | 32.6 | 57.81 | 86.4 |
| Hydrochloric acid (97-3) | 2.2 | 31.4 | 56.76 | 80.0 |
| Nitric acid (97-3) | 2.2 | 32.6 | 58.63 | 87.2 |

It will be noted that these results compare favorably with the results set forth in Examples I, II and III, in which the anionic collecting agent was a mixture of Varlacoid and cresylic acid.

Example XIV

Linoleic acid as the collecting agent

In this example, the anionic collecting agent employed was linoleic acid; the starch was treated with sulphuric acid in 97-3 proportions and was used in an aqueous solution, as hereinbefore described; and the lime was added in a 25% suspension in water, as in previous examples. The quantities of reagents used, in lbs. per ton of feed, were as follows:

| Reagents | First float |
|---|---|
| | Lbs./ton |
| Acid-treated starch | 2.5 |
| Lime | 4.0 |
| Linoleic acid | 1.0 |

| Reagents | Second float |
|---|---|
| | Lbs./ton |
| Acid-treated starch | 0.25 |
| Lime | 1.0 |
| Linoleic acid | 0.5 |

| Reagents | Third float |
|---|---|
| | Lbs./ton |
| Linoleic acid | 0.5 |

As heretofore, the oxidized-iron ore feed was all minus 100 mesh and was conditioned in an aqueous pulp containing about 10% solids. The results are given below:

| Product | Per cent weight | Per cent Fe | Per cent Fe recovery |
|---|---|---|---|
| Feed | 100.0 | 21.47 | 100.0 |
| First froth | 54.0 | 3.90 | 9.8 |
| Second froth | 14.4 | 7.71 | 5.2 |
| Third froth | 2.4 | 29.39 | 3.3 |
| Concentrate | 29.2 | 60.09 | 81.7 |

Example XV

Fatty acid as the collecting agent

In this example, the procedure was the same as in Example XIV except that Upjohn's fatty acid, which is a fish-oil fatty acid, was used as the anionic collecting agent. The results were as follows:

| Product | Per cent weight | Per cent Fe | Per cent Fe recovery |
|---|---|---|---|
| Feed | 100.0 | 21.42 | 100.0 |
| First froth | 58.4 | 3.90 | 10.6 |
| Second froth | 9.7 | 8.36 | 3.8 |
| Third froth | 2.2 | 27.61 | 2.8 |
| Concentrate | 29.7 | 59.68 | 82.8 |

Example XVI

Rosin as the collecting agent

In this example the procedures were the same as in Example XIV, except that the anionic collecting agent was rosin dissolved as a 20% solution in aniline, and except that the quantities of rosin employed were only 0.3 lb. in the first float, 0.2 lb. in the second float and 0.1 lb. in the third float. The results were as follows:

| Product | Per cent weight | Per cent Fe | Per cent Fe recovery |
|---|---|---|---|
| Feed | 100.0 | 21.83 | 100.0 |
| First froth | 45.7 | 2.86 | 6.0 |
| Second froth | 16.8 | 5.85 | 4.5 |
| Third froth | 2.4 | 12.50 | 1.3 |
| Concentrate | 35.1 | 54.81 | 88.2 |

Example XVII

Sodium oleate as the collecting agent

In this example, the anionic collecting agent was sodium oleate which was employed as a 1% aqueous solution; the starch and sulphuric acid (sp. gr. 1.84) were in the proportions of 97-3 in a 2% aqueous solution which was boiled for one minute as heretofore; the lime was in the form of a 25% suspension in water as heretofore; and the oxidized-iron ore feed was minus 100 mesh and was initially conditioned with the reagents in a pulp containing 10% solids as in the examples hereinbefore given. The conditioning time prior to each flotation step was about one minute; and the quantities of reagents used, in lbs. per ton of feed, were as follows:

| Reagents | First float Lbs./ton |
|---|---|
| Starch-sulphuric acid | 2.5 |
| Lime | 4.0 |
| Sodium oleate | 1.0 |

| Reagents | Second float Lbs./ton |
|---|---|
| Starch-sulphuric acid | 0.25 |
| Lime | 1.0 |
| Sodium oleate | 0.5 |

| Reagents | Third float Lbs./ton |
|---|---|
| Sodium oleate | 0.5 |

The results of this test were as follows:

| Product | Per cent weight | Per cent Fe | Per cent Fe recovery |
|---|---|---|---|
| Feed | 100.0 | 21.33 | 100.0 |
| First froth | 38.9 | 2.77 | 5.0 |
| Second froth | 21.4 | 4.56 | 4.6 |
| Third froth | 6.8 | 10.91 | 3.5 |
| Concentrate | 32.9 | 56.33 | 86.9 |

EXAMPLE XVIII

*Varlacoid soap as the collecting agent*

In this example, the conditions were the same as in Example XVII except that a Varlacoid soap was used instead of sodium oleate, in the amounts of 0.5 lb., 0.25 lb. and 0.25 lb. per ton of feed in the three flotation operations. The Varlacoid soap was prepared by heating 50 g. of Varlacoid to 85° C. and slowly adding 5.8 g. of caustic soda with constant stirring. The soap thus formed was completely soluble, and was used in a 1% aqueous solution. The results were as follows:

| Product | Per cent weight | Per cent Fe | Per cent Fe recovery |
|---|---|---|---|
| Feed | 100.0 | 21.34 | 100.0 |
| First froth | 56.6 | 4.96 | 13.1 |
| Second froth | 12.4 | 10.09 | 5.8 |
| Third froth | 2.6 | 29.96 | 3.7 |
| Concentrate | 28.4 | 58.28 | 77.4 |

EXAMPLE XIX

*Acid-treated yellow cornmeal as the starch*

This example demonstrates that the invention may be practiced with yellow cornmeal as the starch-bearing material. The cornmeal was boiled for ten minutes with sulphuric acid (sp. gr. 1.84) in the ratio of 93–7 and as a 2% suspension in water, which resulted in a solution having a pH of 1.7. The quantities of reagents used were the same as those employed in Examples I to XI, which are given in the table just preceding Example I. The results of the test were as follows:

| Product | Per cent weight | Per cent Fe | Per cent Fe recovery |
|---|---|---|---|
| Feed | 100.0 | 21.64 | 100.0 |
| First froth | 55.0 | 4.62 | 11.8 |
| Second froth | 15.4 | 12.80 | 9.1 |
| Concentrate | 29.6 | 57.85 | 79.1 |

EXAMPLE XX

*Wheat flour treated with acid*

This example demonstrates that the invention may be practiced with refined wheat flour as the starch bearing material. As in the previous example, the wheat flour was boiled for ten minutes with sulphuric acid (sp. gr. 1.84) in the ratio of 93–7 and as a 2% suspension in water; and the quantities of reagents used were the same. The results of the test were as follows:

| Product | Per cent weight | Per cent Fe | Per cent Fe recovery |
|---|---|---|---|
| Feed | 100.0 | 21.35 | 100.0 |
| First froth | 47.3 | 4.57 | 10.3 |
| Second froth | 21.3 | 10.39 | 10.5 |
| Third froth | 6.3 | 37.35 | 11.0 |
| Concentrate | 25.6 | 56.63 | 67.6 |

EXAMPLE XXI

*Use of laundry starch in the method*

In this example, the acid-treated starch employed was the laundry starch sold under the trade-name "Linit" by Corn Products Sales Co. Our understanding is that this laundry starch results from the treatment of corn-starch with acidified water at a temperature below that at which the starch granules burst, after which the acidified water is neutralized and removed, followed by drying of the treated starch to produce the market product. Boiling of "Linit" in a 2% aqueous solution for one minute produced good results in the practice of our process, as will appear from the following results of a test in which the quantities of reagents and methods used were the same as those described hereinbefore just preceding Example I.

| Product | Per cent weight | Per cent Fe | Per cent Fe recovery |
|---|---|---|---|
| Feed | 100.0 | 21.39 | 100.0 |
| First froth | 49.6 | 3.26 | 7.5 |
| Second froth | 17.1 | 4.72 | 3.8 |
| Third froth | 2.0 | 13.48 | 1.3 |
| Concentrate | 31.3 | 58.42 | 86.9 |

The same test was repeated using "Linit" which had been boiled in an aqueous solution with sulphuric acid in the ratio of 97–3; but the results were substantially the same.

What is claimed is:

1. The method of concentrating finely-divided oxidized-iron ores in which the gangue ingredient is principally quartz, which consists in treating an aqueous pulp of such an ore with an anionic collecting agent selected from the class consisting of higher fatty acids and resin acids and mixtures of fatty and resin acids and soaps thereof, and with cooperating agents consisting of lime and an aqueous solution of acid-treated starch and subjecting the thus treated ore pulp to froth-flotation treatment and removing the silica-containing froth, thereby producing in the residue of the pulp an oxidized iron concentrate.

2. A method according to claim 1, in which the treatment of the starch with an acidic compound produces an aqueous solution of starch having a pH below 3.

3. A method according to claim 1, in which the treatment of the starch with an acidic compound produces an aqueous solution of starch having a pH ranging from about 1.6 to about 2.2.

4. A method according to claim 1, in which the starch has been treated with an acidic compound only sufficiently to produce partial depolymerization and not dextrin.

5. A method according to claim 1, in which the starch has been treated by boiling it with an acidic compound in an aqueous mixture.

6. A method according to claim 1, in which the starch has been treated by boiling it with an acidic compound in an aqueous mixture only long enough to produce partial depolymerization and not dextrin.

7. A method according to claim 1, in which the starch has been treated by boiling it with an acidic compound in an aqueous mixture for only about one minute.

8. A method according to claim 1, in which the starch has been treated by boiling it with an inorganic acid compound in an aqueous mixture.

9. A method according to claim 1, in which the starch has been treated by boiling it with an organic acid compound in an aqueous mixture.

10. A method according to claim 1, in which the starch has been treated by boiling it with sulphuric acid in an aqueous mixture.

11. A method according to claim 1, in which the starch has been treated by boiling it with sulphuric acid in an aqueous mixture only long enough to produce partial depolymerization and not dextrin.

12. A method according to claim 1, in which the starch has been treated by boiling it with sulphuric acid in an aqueous mixture for only about one minute.

13. A method according to claim 1, in which the starch has been treated by boiling it with hydrochloric acid in an aqueous mixture.

14. A method according to claim 1, in which the starch has been treated by boiling it with hydrochloric acid in an aqueous mixture only long enough to produce partial depolymerization and not dextrin.

15. A method according to claim 1, in which the starch has been treated by boiling it with hydrochloric acid in an aqueous mixture for only about one minute.

16. A method according to claim 1, in which the acid-treated starch has been neutralized.

EARL H. BROWN.
FRANCIS X. TARTARON.

---

CERTIFICATE OF CORRECTION.

Patent No. 2,364,778.  December 12, 1944.

EARL H. BROWN, ET AL.

It is hereby certified that error appears in the printed specification of the above numbered patent requiring correction as follows: Page 2, second column, lines 60 to 63, in the heading to the second table under Example II, for "Proportion of starch to sulphuric acid" read --Proportion of starch to hydrochloric acid--; and that the said Letters Patent should be read with this correction therein that the same may conform to the record of the case in the Patent Office.

Signed and sealed this 20th day of March, A. D. 1945.

Leslie Frazer (Seal)

Acting Commissioner of Patents.

2. A method according to claim 1, in which the treatment of the starch with an acidic compound produces an aqueous solution of starch having a pH below 3.

3. A method according to claim 1, in which the treatment of the starch with an acidic compound produces an aqueous solution of starch having a pH ranging from about 1.6 to about 2.2.

4. A method according to claim 1, in which the starch has been treated with an acidic compound only sufficiently to produce partial depolymerization and not dextrin.

5. A method according to claim 1, in which the starch has been treated by boiling it with an acidic compound in an aqueous mixture.

6. A method according to claim 1, in which the starch has been treated by boiling it with an acidic compound in an aqueous mixture only long enough to produce partial depolymerization and not dextrin.

7. A method according to claim 1, in which the starch has been treated by boiling it with an acidic compound in an aqueous mixture for only about one minute.

8. A method according to claim 1, in which the starch has been treated by boiling it with an inorganic acid compound in an aqueous mixture.

9. A method according to claim 1, in which the starch has been treated by boiling it with an organic acid compound in an aqueous mixture.

10. A method according to claim 1, in which the starch has been treated by boiling it with sulphuric acid in an aqueous mixture.

11. A method according to claim 1, in which the starch has been treated by boiling it with sulphuric acid in an aqueous mixture only long enough to produce partial depolymerization and not dextrin.

12. A method according to claim 1, in which the starch has been treated by boiling it with sulphuric acid in an aqueous mixture for only about one minute.

13. A method according to claim 1, in which the starch has been treated by boiling it with hydrochloric acid in an aqueous mixture.

14. A method according to claim 1, in which the starch has been treated by boiling it with hydrochloric acid in an aqueous mixture only long enough to produce partial depolymerization and not dextrin.

15. A method according to claim 1, in which the starch has been treated by boiling it with hydrochloric acid in an aqueous mixture for only about one minute.

16. A method according to claim 1, in which the acid-treated starch has been neutralized.

EARL H. BROWN.
FRANCIS X. TARTARON.

CERTIFICATE OF CORRECTION.

Patent No. 2,364,778.   December 12, 1944.

EARL H. BROWN, ET AL.

It is hereby certified that error appears in the printed specification of the above numbered patent requiring correction as follows: Page 2, second column, lines 60 to 63, in the heading to the second table under Example II, for "Proportion of starch to sulphuric acid" read --Proportion of starch to hydrochloric acid--; and that the said Letters Patent should be read with this correction therein that the same may conform to the record of the case in the Patent Office.

Signed and sealed this 20th day of March, A. D. 1945.

Leslie Frazer (Seal)

Acting Commissioner of Patents.